April 17, 1962  F. D. AIELLO  3,029,975
CAN HANDLE
Filed May 10, 1960
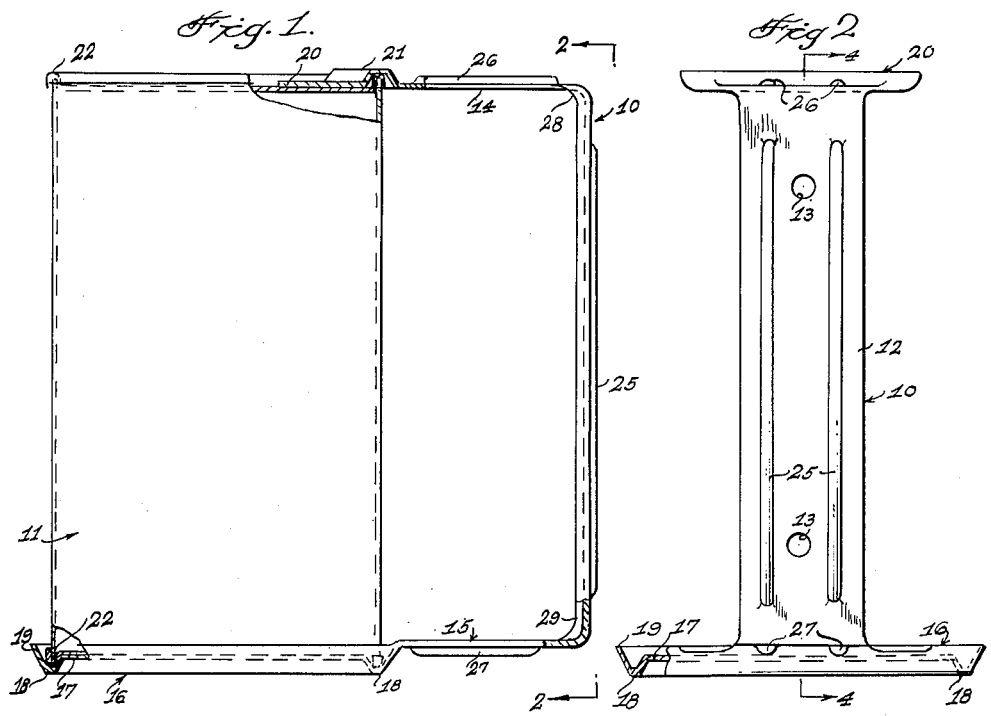
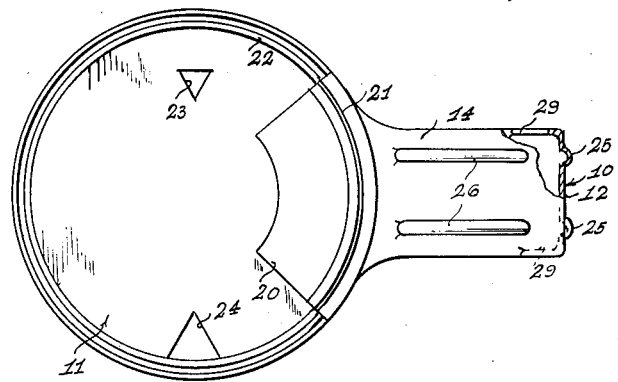
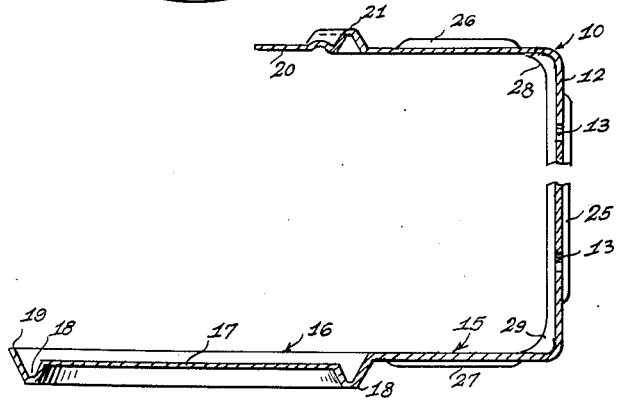
INVENTOR.
FRANK D. AIELLO
BY
ATTORNEYS

United States Patent Office 3,029,975
Patented Apr. 17, 1962

3,029,975
CAN HANDLE
Frank D. Aiello, 5521 W. Camelback, Glendale, Ariz.
Filed May 10, 1960, Ser. No. 28,157
1 Claim. (Cl. 220—85)

This invention relates to a handle, and more particularly to a handle for a can such as a can of beer, soft drinks or the like.

The object of the invention is to provide a handle which can be readily snapped onto or off a can such as a can containing various liquids or fluids, so that it is not necessary to grip a cold can with the hands, and wherein the liquid in the can will be kept colder for a longer period of time because the heat of the hand will not be transmitted directly to the contents of the can.

Another object of the invention is to provide a can handle which will eliminate the necessity for using glasses, cups or the like at picnics, outdoor dinners or the like, and wherein the handle of the present invention will have the practical effect or purpose of transforming a standard can such as a standard beer or soft drink can into a drinking mug or glass.

A further object of the invention is to provide a can handle which is extremely simple and inexpensive to manufacture.

Other objects and advantages of the present invention will be apparent during the course of the following description.

In the accompanying drawings, forming a part of this application, and in which like numerals are used to designate like parts throughout the same.

FIGURE 1 is a side elevational view showing the handle of the present invention mounted on a can, and with parts broken away and in section.

FIGURE 2 is an end elevational view and taken generally on the line 2—2 of FIGURE 1.

FIGURE 3 is a plan view of the assembly of FIGURE 1, and with parts broken away and in section.

FIGURE 4 is a sectional view taken on the line 4—4 of FIGURE 2.

Referring in detail to the drawings, the numeral 10 indicates the handle of the present invention which is adapted to be used on a can such as a can 11, and the handle 10 is adapted to be made of a suitable material of one piece construction, and the handle 10 is shaped to include a generally straight main body portion 12 which is provided with apertures or openings 13 therein, FIGURE 2. Arranged at right angles with respect to the ends of the straight portion 12 and secured thereto or formed integral therewith are spaced parallel upper and lower end portions 14 and 15. The lower portion 15 terminates in a base portion 16 which includes a main flat circular section 17 and there is provided at the outer periphery of the base portion 16 an upstanding arcuate or curved flange 19, there being an annular groove 18 adjacent the flange 19, for a purpose to be later described.

The upper end portion 14 terminates in a gripping portion 20 which is provided with a curved or arcuate groove 21, and as shown in FIGURE 3 for example the gripping portion 20 has a sector shape. The gripping portion 20 is of smaller size than the base portion 16.

The can 11 is of conventional construction and includes the usual beads 22 on its ends, and these beads 22 are adapted to engage the grooves 21 and 18. In FIGURE 3 the numerals 23 and 24 indicate openings which are punched or otherwise formed in the upper end of the can 11, and it will be noted that the gripping portion 20 is of such a size in shape that the openings 23 and 24 will remain uncovered so that the contents of the can 11 can be readily dispensed through one of these openings while the other opening can be used as an air inlet.

The straight portion 12 is provided with longitudinally extending spaced parallel ribs 25, and the end portions 14 and 15 are provided with ribs 26 and 27, and these ribs act as stiffeners to help reinforce the handle.

Arranged at the junction of the portions 14 and 12 are wedge shaped sections 28, while arranged at the junction of the portion 15 and the portion 12 are wedge shaped sections 29 and these wedge shaped sections serve to insure that the required tension will be maintained on the can 11 by the handle.

From the foregoing, it is apparent that there has been provided a handle which is especially suitable for use with a can such as the can 11, and wherein the can 11 may have beer, soda pop or the like therein. The handle 10 is adapted to be made of a suitable material such as metal, plastic or the like, and the handle 10 is of one-piece construction and includes the straight portion 12 as well as the end portions 14 and 15 and these end portions terminate in the gripping portion 20 and the base portion 16. When the handle is to be used, openings such as the openings 23 and 24 are punched or otherwise formed in the top of the can 11, and then the handle 10 is connected to the can 11 in such a manner that the lower end of the can 11 is seated on the base portion 16, while the gripping portion 20 engages the top of the can. The groove 18 in the base portion 16 snugly receives therein the bead 22 on the lower end of the can 11, and the flange 19 serves to help maintain the can 11 in place on the base portion 16. The groove 21 on the gripping portion 20 snugly receives therein a portion of the upper bead 22 so that with the parts arranged as shown in FIGURES 1 and 3 for example, it will be seen that the portion 12 can be readily gripped in the hand whereby the liquid contents from the can 11 can be conveniently poured from one of the openings such as the opening 24 into a suitable glass, cup or other container, or else the handle can be gripped in order to provide a means whereby the fluid or liquid can be directly drank from the can 11.

The openings 13 can be used for suspending the handle 10 from a nail, hook or the like, as for example when the device is not being used.

The ribs 25, 26 and 27 act as stiffeners so as to help maintain the parts in their proper aligned positions. The wedge shaped sections 28 and 29 serve to insure that the portions 14 and 15 will not spread apart too much and and wherein these wedge shaped sections 28 and 29 thus insure that the can 11 will be maintained under proper tension between the portions 20 and 16.

The handle can be made of any suitable material and in different shapes or sizes.

The handle may be stamped out with only one punch press operation so as to reduce manufacturing cost considerably. The handle may be die-formed, and if desired a coaster may be arranged on the bottom or base portion 16.

Thus, it will be seen that there has been provided a snap on snap off handle which can be made of metal that is plated or other suitable material, and wherein the handle of the present invention will serve to transform or convert a standard can such as a twelve ounce beer or soda pop can into a drinking mug or glass and the handle can be made in different sizes and shapes to accommodate different types and sizes of cans and it can also be used on fruit and vegetable juice cans and the like.

Some of the advantages of the present invention are as follows. It keeps hands off of cold wet cans, and it keeps liquid colder longer, because the heat of the hand will not draw the cold from the can. In addition, it will eliminate the need for glasses or paper cups at picnics, patio dinners and the like and when boat fishing and the present invention will give the effect of drinking out of a mug or cup. The handle can be die-cut and formed so as to make it very inexpensive to purchase. Its inexpensiveness will permit them to be commonly used and readily available and the current trend of beverage makers to utilize cans will create an additional necessity of the handle of the present invention.

The device can be made out of cold-rolled steel of a suitable size which can be nickel-plated to increase or enhance the attractiveness thereof and also to prevent rust. The stiffener beads or ribs 25, 26 and 27 are formed in the metal for strength and to help prevent the handle from slipping in the hand. The wedge shaped stiffeners 28 and 29 serve to help keep the required tension on the can. The portion 20 can be made differently for each size can where it is different from the standard size can. The present invention is especially suitable for use with cans such as standard twelve and sixteen ounce beer and soda pop cans. The present invention will conveniently fit a standard 10 ounce, 11 ounce or 12 ounce beverage can.

Minor changes in shape, size and rearrangement of details coming within the field of invention claimed may be resorted to in actual practice, if desired.

What is claimed is:

As a new article of manufacture, a can handle fabricated of a single piece of material and shaped to include a generally straight body portion, spaced parallel upper and lower end portions arranged at right angles with respect to said body portion, said lower end portion terminating in a base portion, said upper portion terminating in a gripping portion, said base portion being larger than said upper end portion and including a main flat circular section, there being an angular groove adjacent the outer periphery of said base portion, an arcuate flange extending upwardly from the outer peripheral edge of said base portion, said gripping portion being smaller than said base portion and including a flat section and an arcuate groove, said groove is adapted to snugly engage the beads on the ends of the can, longitudinally extending, spaced parallel ribs on said straight portion and end portions, and wedge shaped sections at the junctions of the end portions and the straight portion.

References Cited in the file of this patent

UNITED STATES PATENTS

| | | |
|---|---|---|
| 2,424,094 | Herr | July 15, 1947 |
| 2,594,304 | Gertsen | Apr. 29, 1952 |
| 2,801,743 | Geen | Aug. 6, 1957 |
| 2,855,120 | Bramming | Oct. 7, 1958 |
| 2,896,812 | Paprocki | July 28, 1959 |